INVENTORS
HENRY Y. KUHL
PAUL R. KUHL
Sperry and Zoda
ATTORNEY

United States Patent Office 3,349,419
Patented Oct. 31, 1967

3,349,419
EGG WASHING EQUIPMENT
Henry Y. Kuhl and Paul R. Kuhl, both of Copper Hill-Reaville Road, Flemington, N.J. 08822
Filed Dec. 2, 1965, Ser. No. 511,071
1 Claim. (Cl. 15—3.13)

This invention relates to equipment for washing eggs and is directed particularly to egg washers which include brushing means that are so associated with spray washing means as to engage the eggs being washed and at the same time to be repeatedly rinsed and cleaned whereby the egg cleaning operation can be rendered more thorough and complete and at the same time, the brushes are maintained in a clean sanitary condition.

It has been common practice heretofore to wash eggs to remove dirt and stain therefrom to make them more attractive in appearance and in an effort to render the eggs more sanitary to handle and use. For this purpose, it has been usual to spray the eggs with jets of washing liquid and in some instances, the eggs are completely immersed in a bath of cleaning, destaining or washing liquid. It has further been suggested that rotary or reciprocating brushes be employed as an aid in removing dirt from the eggs. Moreover, in order to process a large volume of eggs and at the same time limit the handling thereof, it is desirable to wash the eggs while they are supported on a conveyor movable through the washer, to or from other equipment such as egg candlers or the like.

However, it has been found that prolonged washing or immersion of eggs in a liquid tends to permit the washing liquid to penetrate the shells of the eggs so that the eggs actually may become contaminated rather than rendered more sanitary during the cleaning thereof. On the other hand, the manner in which brushes have heretofore been employed, while speeding up the operation, has resulted in the transfer of dirt and the albumin or yolk from broken eggs to the other eggs being cleaned by reason of the accumulation of such dirt on the brushes employed. Furthermore, when the eggs are supported on a conveyor during the brushing operation, they tend to be displaced or broken because of the relatively rough action of the brushing means heretofore used.

In accordance with the present invention, the eggs to be cleaned are subjected to a relatively brief, combined scrubbing and brushing operation while supported and rotated in place on a conveyor whereby the effectiveness of the cleaning operation is improved and the volume of eggs which may be passed through the washer is greatly increased. The construction and operation of the brushing and egg washing elements are further combined so as to assure immediate cleaning of the brushes after contact thereof with one egg and prior to their contact with another egg whereby the brushes are maintained in a clean sanitary condition at all times and contamination of the eggs does not occur.

These results are preferably attained by providing the equipment with a conveyor on which the eggs to be cleaned, and by which they are supported are rotated as they are advanced. The eggs thus moved are subjected to the action of downwardly directed jets of washing liquid while they are gently but effectively contacted by brushes which move parallel to the conveyor and into and out of the jets of washing liquid being projected onto the eggs. As a result, the brushes themselves are washed and rinsed during the interval in which they move from an egg or row of eggs to another and no accumulation of dirt or other foreign matter on the brushes can occur.

Accordingly, the principal objects of the present invention are to improve the effectiveness and speed with which eggs can be cleaned; to avoid the transfer of dirt or foreign matter from one egg to another during the cleaning thereof; to simultaneously wash and brush eggs in cleaning the same while rinsing the brushing means at the same time; and to provide novel combinations and arrangements of liquid spray and brushing means so as to assure thorough cleaning of eggs without danger of contamination thereof during the operation.

These and other objects and features of the present invention will appear from the following description thereof wherein reference is made to the figures of the accompanying drawings.

Figure 1:
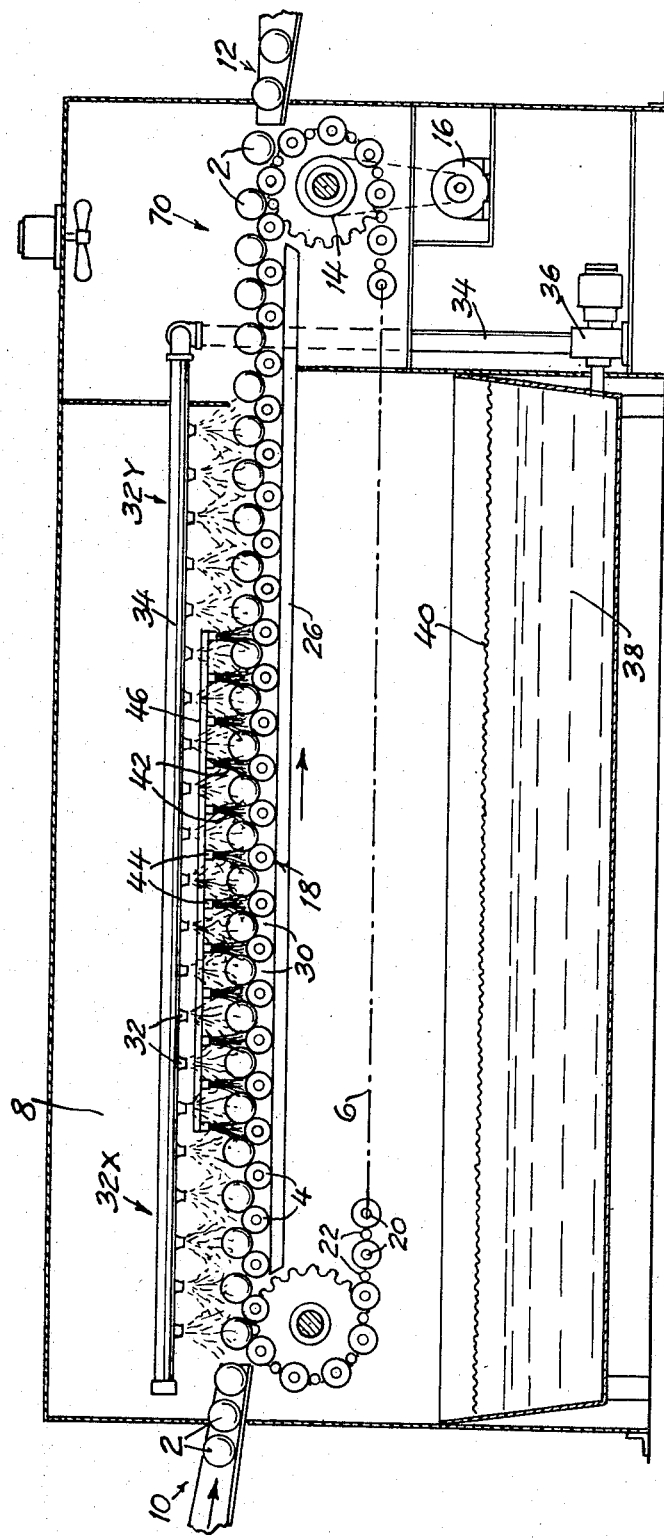
FIG. 1 is a longitudinal sectional view through a typical form of egg cleaning means embodying the present invention.

In that form of the invention chosen for purposes of illustration in the figures of the drawings, the eggs 2 to be cleaned are supported on the rotatable rollers or spools 4 which extend transversely of a continuous conveyor 6 which is movable longitudinally through a washing chamber 8 from the inlet end 10 to the outlet end 12 thereof. The conveyor is advanced by a driving sprocket 14 driven by a motor 16 and presents an upper run 18 which is maintained in a horizontal position. For this purpose, and in order to cause the eggs to be rotated as they are being cleaned, the rollers 4 of the conveyor are supported on transversely extending rods 20 connected at their opposite ends to the chains 22 of the conveyor. The rods 20 have wheels 24 secured thereto and movable along conveyor supporting rails or tracks 26 mounted adjacent the inner walls of the chamber 8 and at opposite sides thereof. The egg supporting rollers 4 are thus caused to rotate as they move through the chamber in the upper horizontal run 18 of the conveyor. The rollers are provided with a plurality of complementary portions 28 of relatively small diameter which cooperate to define a plurality of egg receiving recesses 30 between adjacent rollers in which the eggs are located on the conveyor. These rollers and recesses are of suitable shape and design to hold the eggs in place and in a plurality of parallel rows extending transversely of the conveyor while they serve to rotate the eggs supported thereby.

The upper run 18 of the conveyor is located below spray washing means within the chamber 8. Such washing means preferably includes a plurality of downwardly directed nozzles or jets 32 supplied with washing liquid from pipes 34 by means of a pump 36. The liquid is drawn from a tank or reservoir 38 to which it returns through a screen 40 after passing downward through the conveyor 6. However, the washing liquid may be supplied to the jets 32 and pipes 34 in any other suitable or preferred manner.

Figure 3:
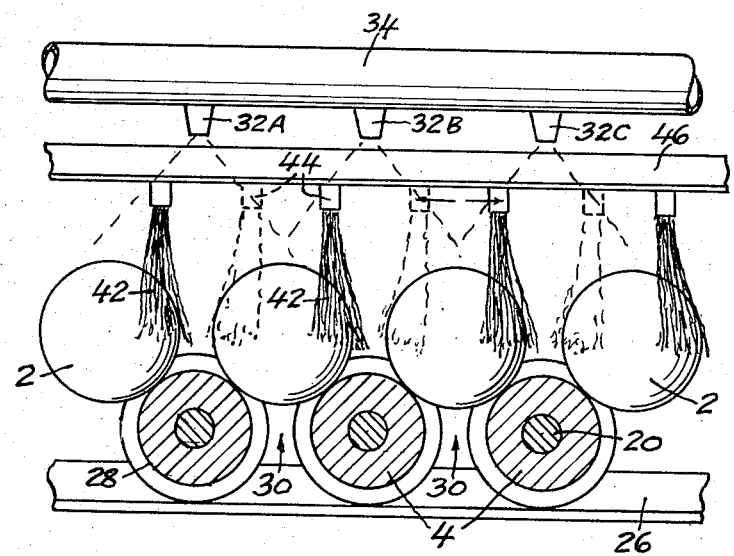
FIG. 3 is a further enlarged longitudinal sectional view illustrating the manner in which the washing and brushing means operate.
Figure 4:
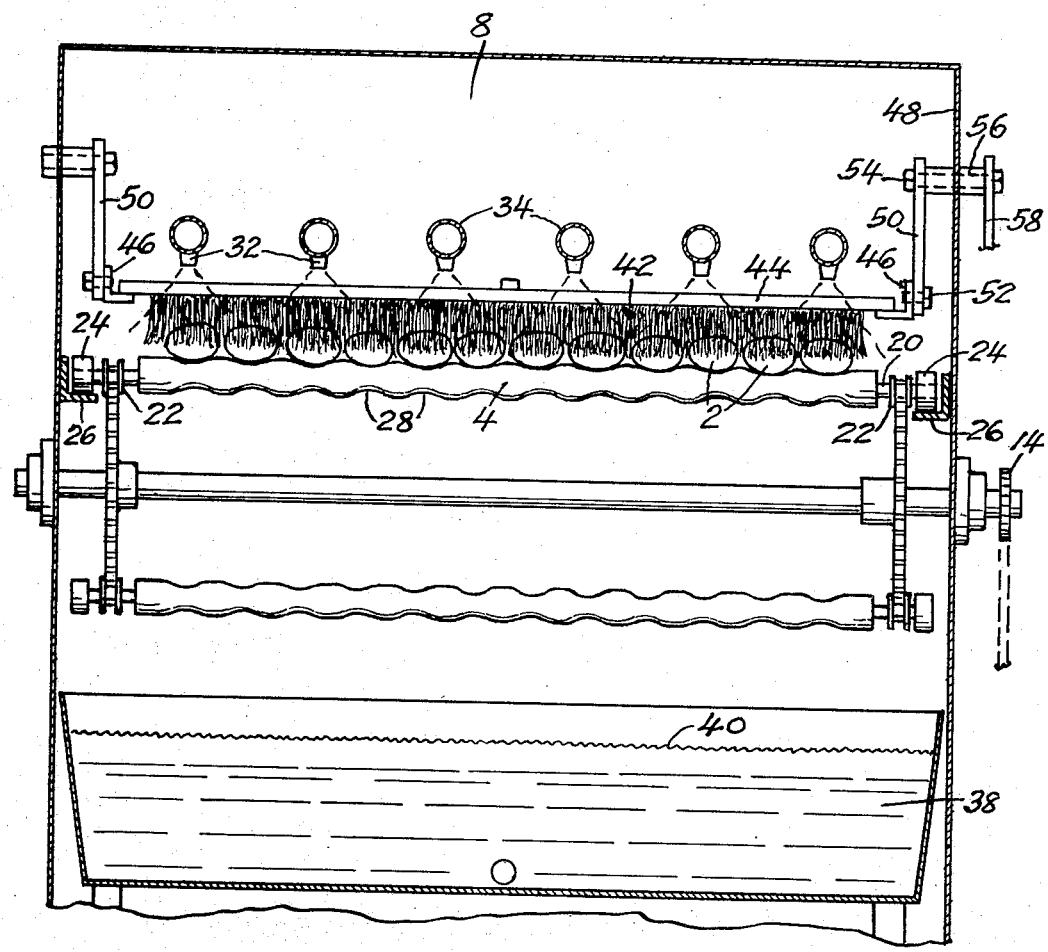
FIG. 4 is a transverse sectional view of the construction shown in FIGS. 1, 2 and 3, taken on the line 4—4 of FIG. 2.

In accordance with the present invention, the jets or nozzles 32 are arranged in a plurality of transversely extending and longitudinally spaced rows above the upper run 18 of the conveyor in position to assure the thorough washing and scrubbing of each egg supported on the conveyor 6 as it moves lengthwise through the chamber 8 from the inlet end 10 to the outlet end 12 thereof. These transverse rows of nozzles are represented in FIG. 3 by the nozzles 32A, 32B and 32C but in practice as many as 20 or 30 or more transversely extending rows of nozzles may be provided.

Figure 2:
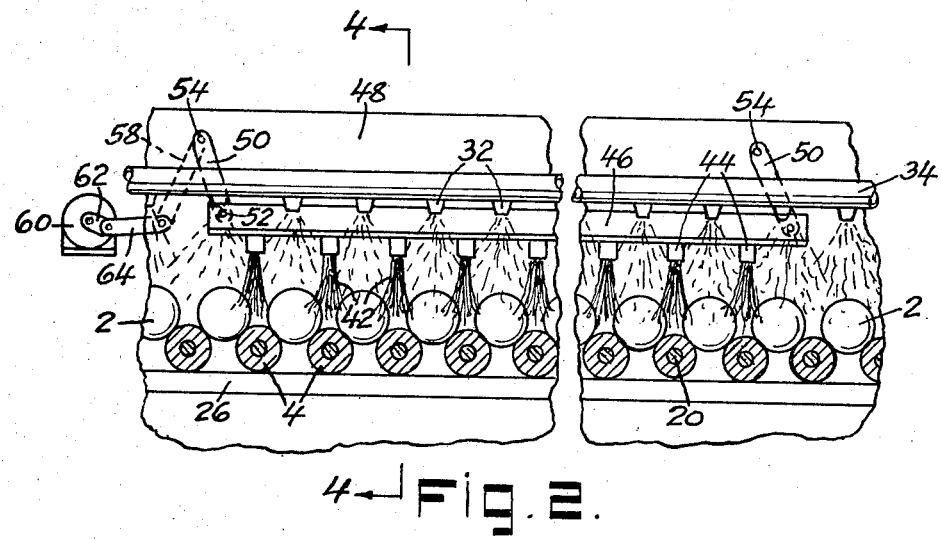
FIG. 2 is an enlarged view of the brush actuating means employed in the equipment shown in FIG. 1.

In order to assure more rapid and effective cleaning of the eggs, a plurality of longitudinally spaced and transversely extending brushing elements 42 are also located above the eggs supported on the conveyor 6. These brushes are movable back and forth longitudinally of the conveyor, below and in the spaces between the transversely extending rows of nozzles 32A, 32B etc. Thus, as shown in FIGS. 2 and 3, the brushes 42 extend substantially the full width of the conveyor but they are relatively thin in a direction longitudinally of the conveyor and are located in the spaces between the longitudinally space transverse rows of nozzles 32A, 32B etc. The brushes 42 are carried by holders 44 which are secured at their opposite ends to angle iron supports 46 located adjacent the side walls 48 of the chamber 8. The supports 46 and the holders 44 with their downwardly extending brushes 42 are movable back and forth above the eggs on the conveyor 6 to provide simultaneous brushing and washing of the eggs as they move through the chamber 8. For this purpose, the angle iron supports 46 are suspended for movement by the links 50 which are pivotally connected at their lower ends to the supports 46 as shown at 52 and are pivotally connected at their upper ends to the side walls 48 of the chamber as indicated at 54. One of the links 50 is fixedly connected to a rock shaft 56 which projects through the wall 48 and is provided at its outer end with a rocker arm 58. The rocker arm 58 is oscillated by suitable drive means such as a motor 60 which actuates a crank 62 to operate a connecting rod 64 pivotally attached to the rocker arm 58.

The bristles of the brushes 42 are preferably arranged so that the longest bristles will extend downward adjacent the ends of the eggs 2 supported in the recesses 30 of the egg supporting rollers 4 of the conveyor. Those bristles of the brushes which are positioned over the centers of the recesses 30 are somewhat shorter so that the lower ends of the bristles conform generally to the upper surfaces of the eggs being cleaned whereby a substantially uniform brushing action is exerted on the eggs throughout the surface thereof as the brushes are reciprocated back and forth above the eggs and the eggs are rotated by the rollers 4 as the conveyor moves through the chamber 8.

Any suitable or preferred number of brushes 42 and transverse rows of nozzles 32 may be provided. However, as shown, the elements are preferably arranged so that the eggs entering the washing chamber 8 through the inlet end 10 thereof, are first subjected to the vigorous spraying action of the washing liquid from a first group of nozzles 32X. In this way, loose dirt and foreign matter are washed off the eggs and they are thoroughly wetted as they are rotated. Thereafter, the eggs are further subjected to simultaneous and alternate washing and brushing as they pass on beneath the reciprocating brushes 42 and additional spray nozzles 32A, 32B, etc. The positioning of the brushes 42 between the transverse rows of spray nozzles 32 and the movement of the brushes back and forth a limited distance and between the nozzles serves to avoid interference between the action of the jets of washing liquid and the action of the brushes 42. The eggs are thereby vigorously and directly washed by the jets of liquid while being alternately and repeatedly brushed as they advance through the chamber 8.

The length of the bristles of the brushes 42 is preferably such that the brushes are deflected by the eggs which they engage during relative movement thereof. Moreover, the nozzles 32 are preferably designed to project the washing liquid downward in the form of a conical spray. Therefore, when the bristles of the brushes are deflected back and forth as the brushes reciprocate, as shown in FIG. 3, first one side and then the opposite side of each brush is presented to the action of the jets of washing liquid. As a result, the brushes are continuously and thoroughly cleaned during each complete cycle of their movement and as they clean and brush the eggs. All dirt and foreign matter is accordingly removed from each brush immediately upon removal thereof from the eggs and before the ly upon removal thereof from the eggs and before the brush is brought into contact with adjacent eggs on the conveyor. Therefore, the possibility of contamination of any egg by transfer of dirt or foreign matter thereto from another egg by the brushes employed is entirely eliminated.

Furthermore, as indicated in FIG. 3, the bristles of the brushes 42, when deflected by the eggs, tend to urge the eggs downward into the recesses 30 between the rollers 4 of the conveyor whereby displacement of the eggs by the brushes during the operation thereof is avoided. Nevertheless, the brushes are effective in removing any stubborn or firmly adhering dirt from the eggs whereby the eggs are cleaned in a much shorter time than would otherwise be possible. Thereafter, the eggs passing on beyond the brushes 42 may be given a final brief rinsing, if desired, by liquid from nozzles 32Y after which they may be moved through a drying zone 70 and on out through the outlet end 12 of the chamber 8.

In actual practice, the equipment serves to reduce the time required for cleaning and washing eggs sufficiently to permit the use of washing liquid at a lower temperature than has heretofore been required. Moreover, the duration of the washing period is shortened so that the danger of liquid penetrating the egg shells to contaminate the same is practically non-existent. In fact, it has been found that the operation is so rapid and gentle that even cracked eggs can be safely washed with such equipment.

The width of the conveyor, and brushes used in any particular installation can, of course, be varied and as many as a dozen or more eggs can be present in each transversely extending row of eggs on the conveyor. The capacity of the egg washing equipment is, therefore, increased while the time required for cleaning the eggs is reduced. The effectiveness of the cleaning operation is also improved and the danger of breakage or damage to the eggs is greatly limited. At the same time, the size and cost of the equipment and the amount of washing liquid required also can be reduced considerably.

The conveyor on which the eggs are supported may, if desired, be extended on to other equipment such as egg candlers, graders, packers or the like whereby the washer may be incorporated into egg handling systems for use in large installations although it is equally applicable for use independently of other equipment.

While the equipment shown in the drawings and described above is preferred, the various elements of the combination are each capable of modification and change in their form and arrangement. In view thereof, it should be understood that the particular embodiment of the invention as herein set forth, is intended to be illustrative only and is not intended to limit the scope of the invention.

We claim:

Egg cleaning equipment comprising a washing chamber having an inlet end and an outlet end, an egg receiving conveyor movable through said chamber from said inlet and to the outlet end of said chamber, a plurality of spray nozzles located in said chamber above said conveyor and positioned in rows extending transversely of the conveyor and spaced apart longitudinally of the conveyor said nozzles being operable to direct sprays of washing liquid downward therefrom onto eggs supported on the conveyor, a plurality of brushes extending transversely of the conveyor and mounted on supports located in the space between the spray nozzles and the conveyor, said brushes being of a width less than the longitudinal distance between said rows of nozzles, and means for moving said brushes back and forth in a direction longitudinally of said conveyor, the bristles of said brushes extending downward from the supports therefor into engagement with eggs supported on said conveyor, said bristles being flexible and serving to brush across the eggs first in one direction and then in the opposite direction as the brushes are moved back and forth, the bristles of the brushes also being deflected by the eggs during such back and forth movement thereof so as to subject the opposite sides of the brushes to the cleaning action of said sprays of washing liquid to cause dirt to be removed from both the eggs and the brushes by the washing liquid as the brushes are moved back and forth in contact with the eggs on said conveyor.

References Cited

UNITED STATES PATENTS

| | | | |
|---|---|---|---|
| 1,074,940 | 10/1913 | Freer | 15—3.13 |
| 1,964,275 | 6/1934 | Secondo | 15—3.13 X |
| 2,301,931 | 11/1942 | Davis | 15—3.16 X |
| 2,979,746 | 4/1961 | Willsey | 15—3.13 |
| 3,097,382 | 7/1963 | Angle | 15—3.13 |
| 3,099,848 | 8/1963 | Mountz | 15—3.14 |
| 3,155,102 | 11/1964 | Niederer et al. | 15—3.13 X |
| 3,252,607 | 5/1966 | Rose et al. | 15—3.13 X |

CHARLES A. WILLMUTH, *Primary Examiner.*

E. L. ROBERTS, *Assistant Examiner.*